(No Model.) 2 Sheets—Sheet 1.
J. HAYDEN.
GRAIN DRILL.
No. 457,277. Patented Aug. 4, 1891.
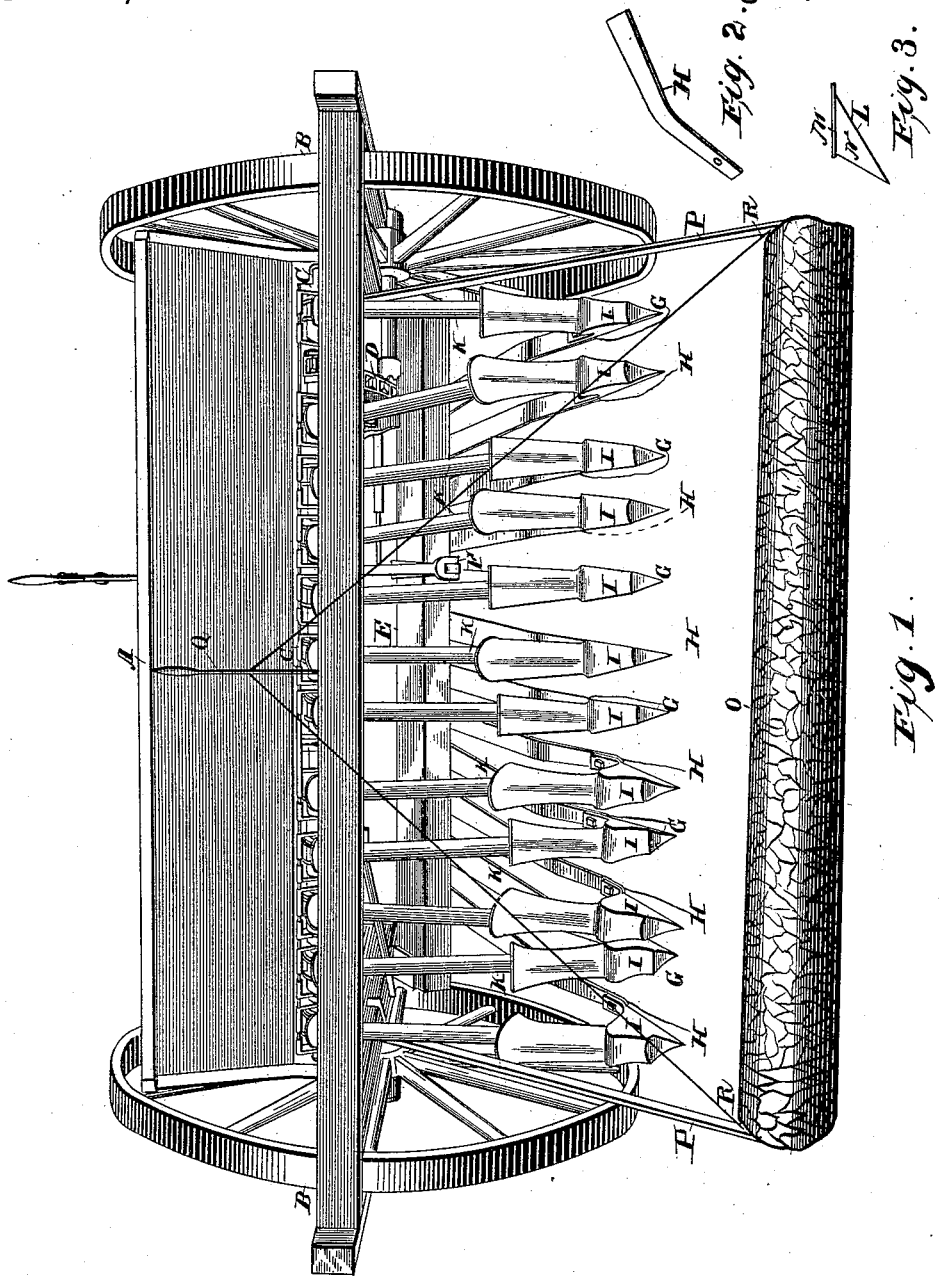
Witnesses
Inventor
J. Hayden.
By Hopkins & Atkins
Attorneys (No Model.) 2 Sheets—Sheet 2.

J. HAYDEN.
GRAIN DRILL.

No. 457,277. Patented Aug. 4, 1891.

Witnesses
Louis G. Julihn
C. P. Elwell

Inventor
Jerome Hayden
By Hapkins & Atkins
Attorneys

UNITED STATES PATENT OFFICE.

JEROME HAYDEN, OF OWENSBOROUGH, KENTUCKY.

GRAIN-DRILL.

SPECIFICATION forming part of Letters Patent No. 457,277, dated August 4, 1891.

Application filed February 24, 1891. Serial No. 382,431. (No model.)

*To all whom it may concern:*

Be it known that I, JEROME HAYDEN, of Owensborough, county of Daviess, and State of Kentucky, have invented certain new and useful Improvements in Grain-Drills, of which the following is a specification, reference being had to the accompanying drawings.

The object of my invention is to produce a grain-drill by means of which the rows of grain may be set closer together than they are ordinarily sowed in practice.

Grain ordinarily is drilled into the earth in rows about eight inches apart, which has usually been found in practice to be as close together as ordinary drills will operate perfectly. The reason appears to be that as the teeth of most drills are set in a straight line they tend to catch trash and to clog up if they are placed any closer together than eight inches. Consequently it has been found advantageous to place them in two rows, one in front of the other; but where the shoes are mounted on springs the springs come so close to the ground that they tend to gather trash, which, when it is accumulated in sufficient quantities, lifts the shoe out of the ground, and in that way interferes with the operation of the drill.

My invention, so far as it relates to the adaptation of drills to sow close together, consists in providing for every alternate shoe a spring bent nearly at right angles above the point at which it is secured to the shoe, so as to avoid the difficulty above described.

Figure 4:
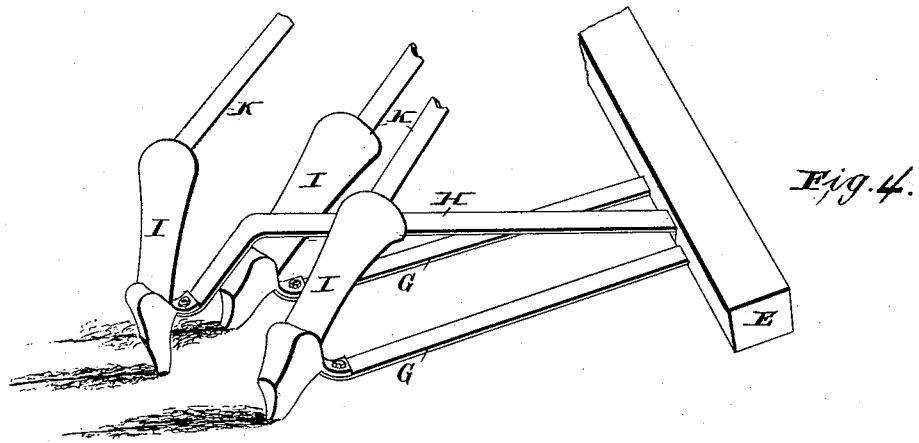
Figures 5, 6:
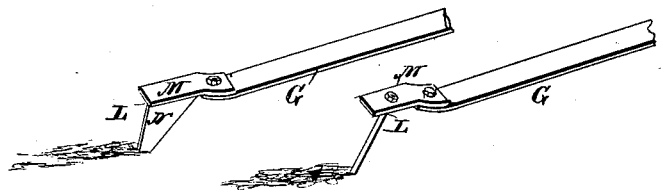

In the accompanying drawings, Figure 1 is a perspective view of my drill. Fig. 2 is a detail view of one of the longer springs of my drill detached. Fig. 3 is a detail view of one of the cultivator-teeth detached. Fig. 4 is a detail view of the pivoted beam detached, showing pivoted drag-bars and shoes attached thereto. Figs. 5 and 6 are detail views of the springs detached, showing the shoes removed and the cultivator-teeth in position.

Referring to the letters on the drawings, A indicates a frame of a drill, mounted, as usual, upon suitable wheels B and provided with any suitable feed mechanism C, which is operated from one of the wheels by sprocket-wheels and band-gear D.

E indicates a beam pivotally secured across the front end of the frame A and provided with an ordinary rack-and-lever connection F, by which it may be partially turned upon its pivot for raising and lowering the drag-bars and shoes of the drill in the usual manner. Arranged at suitable distances—say five inches apart—upon this beam are spring drag-bars G, of ordinary kind, and spring drag-bars H. The latter are distinguished by being longer than the springs G, and are bent near their loose ends nearly at right angles, so that in use the greater part of the springs extend almost in a horizontal position above the ground. Upon the ends of these springs are secured, as usual, shoes I, through which grain is fed from the feed mechanism by means of tubes K. The shoes are secured to the springs by means of bolts, so that they may be readily removed, and in their place may be substituted the cultivator-teeth L. These teeth each consist of a perforated plate M, adapted to be secured to the springs, and a point N, which may be made of triangular plate metal or may be single rods, but in either case should be secured to the plate M, integrally or otherwise, so that the rod or the front edge of the triangular piece meets the plate M at an oblique angle. By this arrangement the drill may be used as a cultivator for cultivating grain. It will cover in cultivating as much ground as the drill did, and is not liable to catch and have the teeth torn away by snags or roots.

O indicates a roller secured by side pieces P to the frame and provided with a lever Q upon the frame and guys R or other suitable connection, secured to the side pieces, by which the roller may be raised and lowered at convenience.

What I claim is—

1. The combination of the suitably-mounted frame A, the cross-beam pivotally secured thereto, and springs secured at one end to the cross-beam for carrying the shoes of the drill, each alternate spring being longer than its neighbor and bent nearly at right angles at its loose end, so that the greater part of those springs are parallel with the ground, substantially as set forth.

2. A spring drag-bar bent nearly at right angles at its rear end and adapted to carry a drill or other tooth, substantially as shown and described.

In testimony of all which I have hereunto subscribed my name.

JEROME HAYDEN.

Witnesses:
WILFRED CARICO,
J. C. RUDD, Jr.